United States Patent Office 3,092,661
Patented June 4, 1963

3,092,661
PREPARATION OF DICHLOROACETAMIDE FROM MALONITRILE
David H. Rosenblatt, 3609 Springdale Ave., Baltimore 16, Md., and Gordon H. Broome, 2909 E. Long Ave., Gastonia, N.C.
No Drawing. Filed June 5, 1962, Ser. No. 200,289
5 Claims. (Cl. 260—561)
(Granted under Title 35, U.S. Code (1952), sec. 266)

The invention described herein may be manufactured and used by or for the Government of the United States of America for governmental purposes without the payment to us of any royalty thereon.

This invention relates to a new process for the production of dichloroacetamide.

This compound has been made by Conrad and Bruckner, Ber. 24: 2994 (1891), by the reaction of diethyl dichloromalonate with alcoholic ammonia.

We have found that the addition of a dilute molar malononitrile solution to about 2–4 moles of an approximately neutral solution of hypochlorite ions at ambient temperature produces dichloroacetamide.

This is quite surprising in view of the fact that a similar reaction of chlorine with an aqueous malononitrile solution was reported by Ott et al., Ber. 55: 1255 (1922) and Ber. 58: 1703 (1925), to give dichlorocyanoacetamide and dichloromalononitrile.

The product of our process is a useful intermediate. For example, the brominating agent N-bromodichloroacetamide can be made from dichloroacetamide by the process set forth in the patent to Park et al., 2,713,596.

We have found that there are several variables in this process. Our process requires no heating since it is complete in about one-half an hour to two hours at a temperature of 20–25° C. While best results are obtained when the pH of the reaction is kept at 7, the reaction is operable over the range of pH from 6–10. Likewise, the best results are obtained when the molar ratio of malonitrile to hypochlorite ion is 1:2.5 but the process is successful over the broader range of 1:2 to 1:4.

While we do not wish to be bound by any theory, it is highly probable that the reaction follows the following scheme:

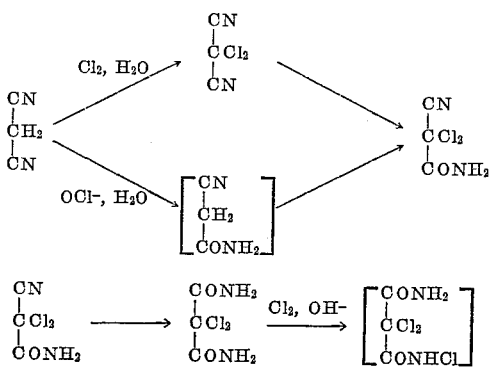

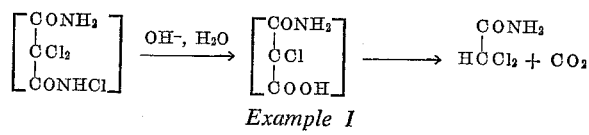

*Example 1*

Cold chlorine water was adjusted with sodium hydroxide solution to pH 7.05 and titrated to show the presence of 0.0675 mole of chlorine in 612 ml. of water. An aqueous solution containing a total of 0.027 mole of malononitrile was slowly added in two portions of 75 ml. and 20 ml. During the addition of the first portion, 14 ml. of 1 N sodium hydroxide was added concurrently, with the use of a pH meter, in an effort to keep the pH constant, but the pH rose to 8 towards the end of the first addition and then began decreasing very slowly when the sodium hydroxide addition was stopped. The second portion of malononitrile was added rapidly without any additional base with the expectation that the pH would drop. Instead, the pH rose suddenly to 9.5 then fell slowly, and the solution turned yellowish brown. Titration indicated the complete loss of active chlorine. After standing overnight, the mixture was taken to dryness on a rotating evaporator and the solid thus obtained was extracted with benzene to give an extract and a small amount of residue. The benzene extract was evaporated to give a solid which was recrystallized from ligroin to give dichloroacetamide, M.P. 96–99° C.

Calculated for $C_2H_3ONCl_2$: C, 18.8; H, 2.34; O, 12.5. Found: C, 19.0; H, 2.4; O, 12.6.

The small amount of solid remaining from the benzene extraction was found to consist mainly of dichloromalondiamide.

For the purposes of this invention, we define a hypochlorite ion generating material as one which is capable of furnishing hypochlorite ions in an aqueous solution. Non-limiting examples of such materials are hypochlorous acid, sodium hypochlorite, lithium hypochlorite, calcium hypochlorite and neutral chlorine water.

We claim:

1. A method of preparing dichloroacetamide which comprises adding aqueous malononitrile to a hypochlorite ion generating material, maintaining the pH of the reaction in the range 6–10 until it is complete and recovering the product.

2. A method as set forth in claim 1 in which the molar ratio of malononitrile to said hypochlorite ion generating material is within the range 1:2 to 1:4.

3. A method as set forth in claim 1 in which the molar ratio of malononitrile to said hypochlorite ion generating material is 1:2.5 and the pH of the system is maintained substantially at pH 7.

4. A method as set forth in claim 1 in which said hypochlorite ion generating material is hypochlorous acid.

5. A method for preparing dichloroacetamide which comprises slowly adding about one mole of aqueous malononitrile to about 2.5 moles of hypochlorous acid at substantially pH 7, maintaining the reaction substantially at said pH by the addition of base until the reaction is complete and recovering the product.

No references cited.